United States Patent [19]

Maioglio

[11] 4,162,666

[45] Jul. 31, 1979

[54] SPARK ADVANCE APPARATUS FOR CONTROLLING THE IGNITION INSTANT OF A SPARK PLUG INDEPENDENT OF THE MAGNITUDE OF A POWER SOURCE IGNITING THE SPARK PLUG

[75] Inventor: Mauro Maioglio, Turin, Italy

[73] Assignee: Fabbrica Italiana Magneti Marelli S.p.A., Milan, Italy

[21] Appl. No.: 818,571

[22] Filed: Jul. 25, 1977

[30] Foreign Application Priority Data

Jul. 27, 1976 [IT] Italy .................. 25743 A/76

[51] Int. Cl.² .................................... F02P 5/06
[52] U.S. Cl. .......................... 123/117 D; 123/117 R
[58] Field of Search ............ 123/117 D, 117 R, 148 E

[56] References Cited

U.S. PATENT DOCUMENTS

| 3,901,201 | 8/1975 | Mizuguchz et al. | 123/117 D |
| 3,923,022 | 12/1975 | Scholl | 123/148 E |
| 3,998,193 | 12/1976 | Ives et al. | 123/148 E |
| 4,051,822 | 10/1977 | Yoshida | 123/117 D |

FOREIGN PATENT DOCUMENTS

| 2621075 | 11/1976 | Fed. Rep. of Germany | 123/117 R |
| 2631323 | 2/1977 | Fed. Rep. of Germany | 123/117 R |
| 2642255 | 3/1977 | Fed. Rep. of Germany | 123/117 R |

*Primary Examiner*—Charles J. Myhre
*Assistant Examiner*—P. S. Lall
*Attorney, Agent, or Firm*—Ostrolenk, Faber, Gerb & Soffen

[57] ABSTRACT

Spark advance apparatus for an internal combustion engine utilizes an electronic counter circuit to count pulses generated at a rate proportional to engine speed and also utilizes a device energized by the counter circuit to control the charging time of the ignition coil. The counter circuit includes a first counter that is active until a first count is reached. Thereafter, a second counter of the counter circuit counts a predetermined number of pulses occurring at a frequency relates to a particular engine parameter. The device to control charging of the coil is activated at the end of the count by the second counter.

11 Claims, 5 Drawing Figures

SPARK ADVANCE APPARATUS FOR CONTROLLING THE IGNITION INSTANT OF A SPARK PLUG INDEPENDENT OF THE MAGNITUDE OF A POWER SOURCE IGNITING THE SPARK PLUG

BACKGROUND OF THE INVENTION

This invention relates to a spark advance apparatus in internal combustion engines comprising an electronic counter circuit for counting frequency pulses proportional to the speed of rotation of the engine and a device for controlling the charge time of the ignition coil as a function of the count.

In a preceding patent application in the name of the present inventor, there is described and shown an advance apparatus of the aforesaid type, wherein the coil charge control device, from the instant of arrival of an activation signal supplied by the counter circuit thereto and for a time period depending on the battery voltage, provides for both driving the supply for the primary winding of the ignition coil and affecting by a reaction the counter circuit, so that the activation signal to the control device is supplied at an instant taking into account the change in the coil charge time in the preceding cycle.

BRIEF SUMMARY OF THE INVENTION

It is the object of the present invention to provide a novel counter advance apparatus provided with a device for controlling the ignition coil charge time, enabling to obtain a spark advance as a function of one or more parameters involving the engine, such as for example the speed of rotation, pressure and temperature.

It is another object of the invention to provide an advance apparatus wherein the advance law can be simply modified according to the type of internal combustion engine.

Therefore, the present invention is related to a spark advance apparatus of the above said type, comprising:

a first counter for counting in two subsequent steps the frequency pulses proportional to the engine speed of rotation until a predetermined counting rate is reached; the first counting step being controlled by the reaction signal of the control device, and the second step being started by a top dead center signal to proceed until reaching the predetermined counting rate; and a second counter for counting from the instant that the counting of the first counter has been completed a certain number of pulses varying as a function of parameters involving the engine, and activating the control device at the end of said count.

According to a preferred embodiment, the count of the first counter is controlled by a comparator defining the predetermined counting rate as a function of maximum advance.

According to another very significant aspect of the invention, the number of pulses counted by the second counter is set by a memory, coded according to a predetermined advance law and supplying such a digital value as a function of parameters involving the engine.

Additionally, by summing the values provided by the memory with a constant value, the advance curve can be translated through a constant angle.

BRIEF DESCRIPTION OF THE DRAWINGS

The invention will now be described by way of example with reference to the accompanying drawings, in which.

DETAILED DESCRIPTION OF THE DRAWINGS

Figure 1:
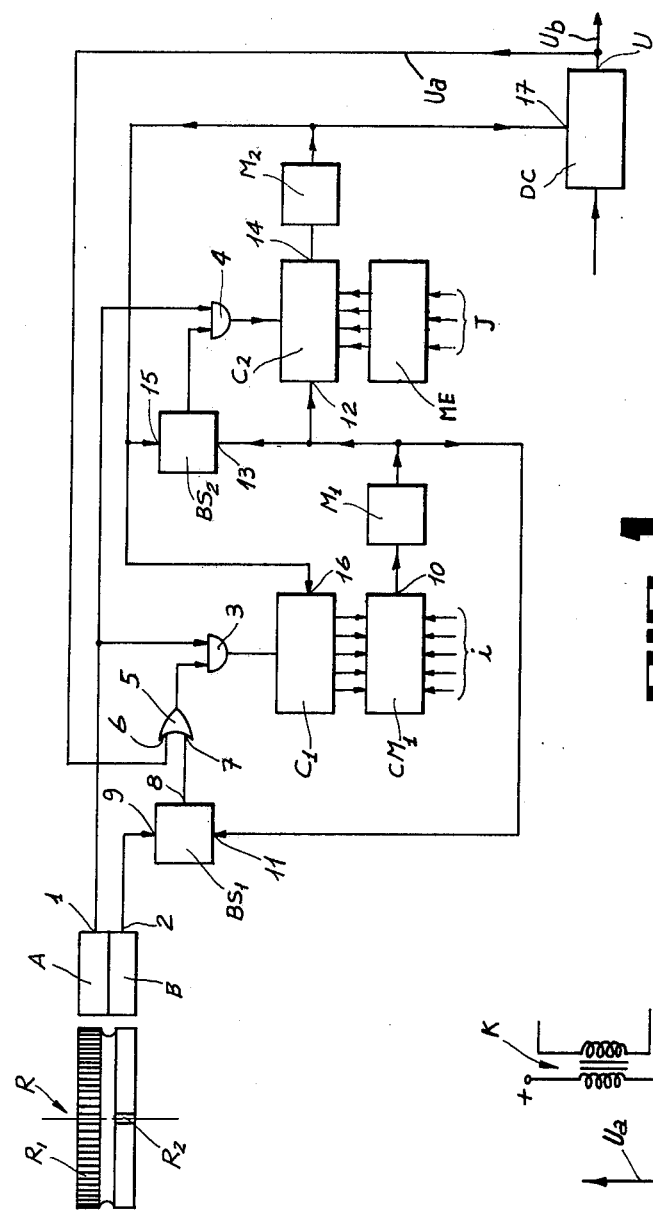
FIG. 1 is a block diagram showing the counter advance apparatus having a control device for the charging current of the ignition coil.

Referring to FIG. 1, reference character R designates a gear wheel rotably driven by the drive shaft, whereas A and B designate two input circuits for the advance apparatus as coupled with said gear wheel.

Gear wheel R has two sets of teeth, of which the first set $R_1$ comprises a plurality of teeth and the second set $R_1$ comprises at least one tooth. Input circuit A is coupled to tooth set $R_1$ to supply at output 1 a series of pulse signals having a frequency depending on the speed of rotation of said gear wheel R. Similarly, the second input circuit B is connected to tooth set $R_2$ to supply at output 2 pulse signals at top dead centers (TDC), also having a frequency depending on the speed of rotation of gear wheel R.

Output 1 of circuit A is connected through respective AND gates 3 and 4 to the inputs of two counters $C_1$ and $C_2$. Gate 3 is enabled by an OR gate 5 whose input 6 is connected to output U of control device DC through line Ua and whose input 7 is connected to output 8 of a bistable circuit $BS_1$, the set input 9 of which is connected to output 2 of circuit B.

Counter $C_1$ is associated with a comparator $CM_1$ which compares the number of counted pulses (in counter $C_1$) with a predetermined value set therein through inputs i. This value is defined in connection with the desired maximum advance angle. Output 10 of comparator $CM_1$ is connected by a monostable multivibrator $M_1$ to reset input 11 of bistable circuit $BS_1$, preset input 12 of the second counter $C_2$ and set input 13 of a bistable circuit $BS_2$. Bistable circuit $BS_2$ enables AND gate 4.

The second counter $C_2$ is associated with a memory ME, the input j of which has applied thereto signals involving the engine operation, such as those corresponding to r.p.m., pressure in induction manifold, water temperature, oil temperature, throttle position, derivative of throttle position, and the like. Output 14 of counter $C_2$ is connected by a monostable multivibrator $M_2$ to reset input 15 of bistable circuit $BS_2$, reset input 16 of counter $C_1$, and activating input 17 of control device DC.

Figure 2:
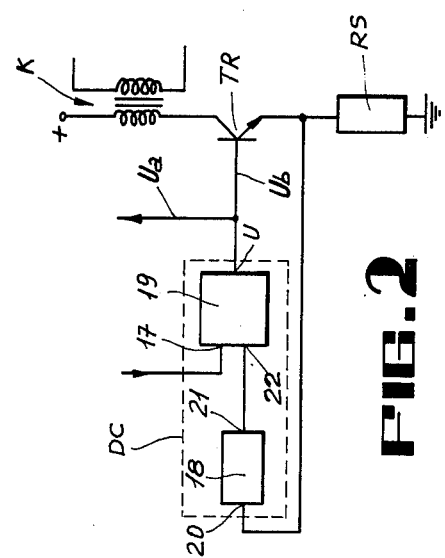
FIG. 2 shows an embodiment of the control device for the charging current of the ignition coil.

Through a line Ub, control device DC drives an electronic switch, designated at TR of FIG. 2, controlling the current flow in the primary winding of the ignition coil. In a simple solution shown in said FIG. 2, the control device DC substantially comprises a threshold circuit 18 and a bistable circuit 19. Input 20 of circuit 18 has applied thereto a voltage signal appearing across a resistor RS in series with the primary winding of a coil K and generates a voltage at its output 21 as soon as the voltage across resistor RS reaches the value corresponding to the predetermined value of the coil charging current.

The input to bistable circuit 19 has applied thereto both the activating or energizing signal from counter $C_2$ through monostable multivibrator $M_2$ (see input 17) and the pulse supplied by threshold circuit 18 (see input 22).

Figure 3:
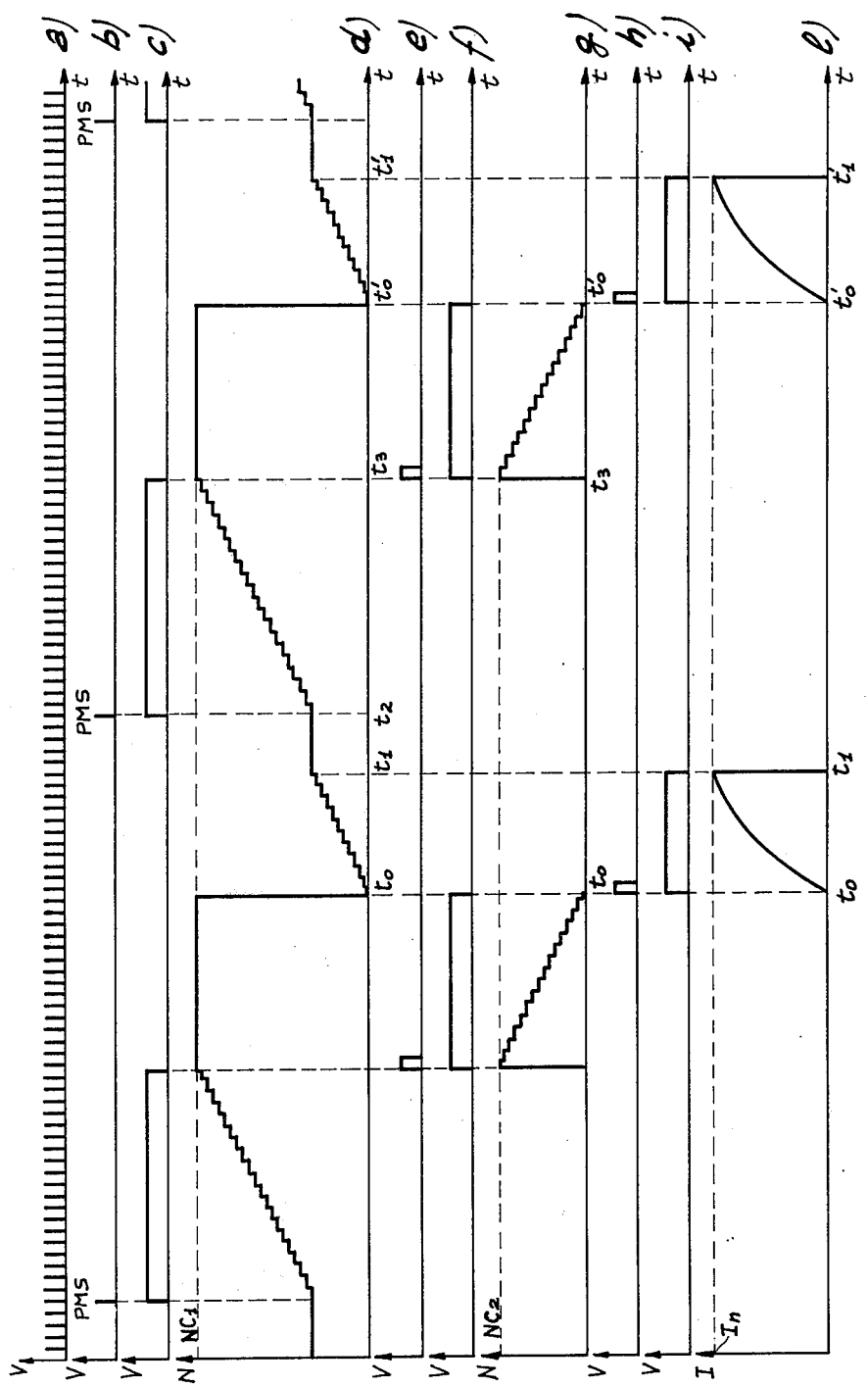
FIG. 3 shows the operating diagram for the apparatus of FIG. 1.

In addition to being connected to transistor TR, output U of bistable circuit 19 is also connected by line Ua to input 6 of OR gate 5 to supply the reaction signal. Referring to FIG. 3, the operation of the advance apparatus shown in FIG. 1 is as follows.

As gear wheel R rotates, pulse signals will appear at output 1 of first input circuit A, as shown in FIG. 3a, while pulse signals at top dead centers appear at output 2 of the second input circuit B, as shown in FIG. 3b.

From instant $t_o$, which is assumed to be that instant at which charging of ignition coil is initiated, the first counter $C_1$ starts to count the pulses appearing at output 1 (see FIG. 3d) and such a count is carried out in two successive steps until a predetermined value $NC_1$ is reached, as hereinafter explained. The first count step lasts for a time $t_o - t_1$ (see FIG. 3i), which is the operating time of the control device DC. Such a time varies to enable the current flowing through the primary winding of the coil to always reach the predetermined charge value or rate In (see FIG. 3l).

At the end of this period (see instant $t_1$), the control device DC shuts off the supply to the primary winding, causing a discharge at the secondary winding of the coil and accordingly the spark at the spark plug.

At this instant, the control device DC is no longer operating and no longer supplies the reaction signal through the line $V_a$ to gate 5, so that gate 5 disables gate 3 and counting of first counter $C_1$ is stopped.

The second count step starts at instant $t_2$, that is when a top dead center (TDC) signal activates bistable circuit $BS_1$ (see FIG. 3c). Now, bistable circuit $BS_1$ provides through gate 5 to enable again said gate 3, and thus counting is resumed by counter $C_1$.

Such a count continues until the number of counted pulses reaches said value $NC_1$ (see FIG. 3d), which condition occurs at instant $t_3$. Counter C, stops counting because bistable circuit $BS_1$ is reset due to the operation (at said instant $t_3$) of monostable multivibrator $M_1$ associated with comparator $CM_1$ (see FIG. 3e).

Additionally, monostable multivibrator $M_1$ presets counter $C_2$ by loading it with a digital value $NC_2$ supplied by memory ME. Monostable multivibrator M, also sets bistable circuit $BS_2$ (see FIG. 3f) which in turn controls, through gate 4, the start of countdown of counter $C_2$ from said digital value $NC_2$ (see FIG. 3g).

Counter $C_2$ continues counting down until the count in counter $C_2$ reaches zero, which condition occurs at instant $t_o'$. At this time, monostable multivibrator $M_2$ provides a signal (see FIG. 3h) energizing the control device DC (see FIG. 3i), resets bistable circuit $BS_2$ (discontinuing countdown of counter $C_2$)and resets counter $C_1$.

At this time, the first count step of counter $C_1$ is resumed, since in addition to energizing said switch TR, the control device DC enables again gate 3 through gate 5.

Obviously, as the engine r.p.m. and/or other parameters of interest vary, the digital value $NC_2$ supplied by memory ME to counter $C_2$ varies and accordingly the countdown step varies, causing a different ignition advance angle. Memory ME enables to vary the advance curve by merely changing its contents, whereby the advance apparatus can be used in engines of different characteristics.

In the embodiment shown, counter $C_2$ is loaded by memory ME to the digital value $NC_2$ and counts down until zero value is reached. Alternatively, this counter, $C_2$ can count pulses from zero value until digital value $NC_2$ supplied by memory ME is reached.

Figure 5:
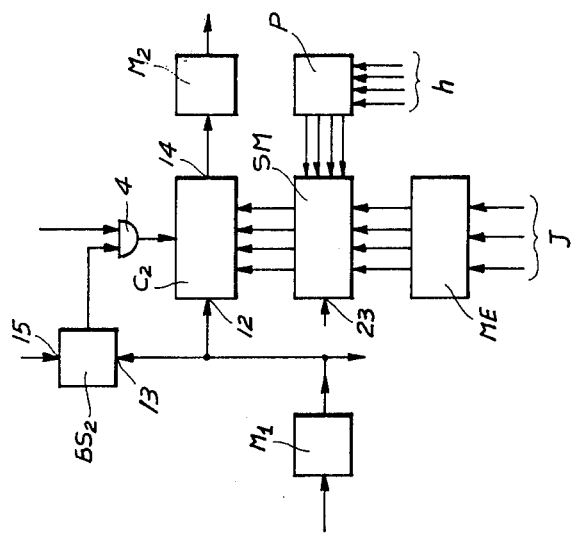
FIGS. 4 and 5 show two variations to the apparatus of FIG. 1.
Figure 4:
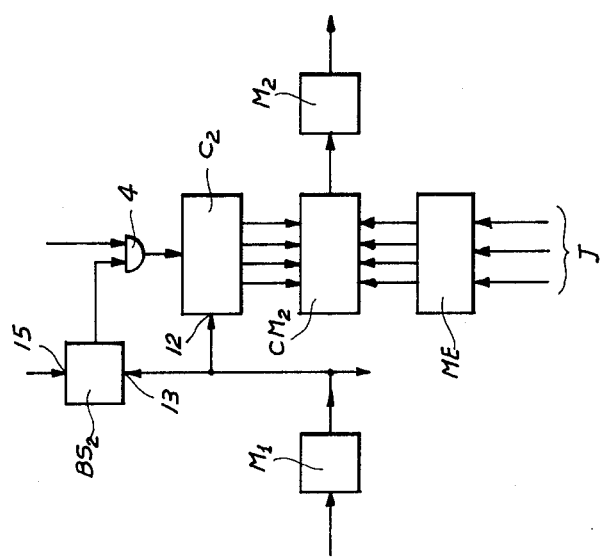

In such a case, the advance apparatus is modified as shown in FIG. 4, wherein a comparator $CM_2$ in inserted between counter $C_2$ and memory ME, this comparator comparing the number of pulses counted by counter $C_2$ with the value supplied by memory ME. In this solution, counter $C_2$ is reset by monostable multivibrator $M_1$ and control device DC is energized by comparator $CM_2$, through monostable multivibrator $M_2$, when the count value of counter $C_2$ is equal to that supplied by memory ME.

Where desired to modify the advance curve by a constant angle without changing the contents of memory ME, an algebraic adder SM is inserted between the latter and counter $C_2$, as shown in FIG. 5. The adder SM can add to or subtract a constant amount from the value supplied by the memory, so that the advance curve can be translated or displaced. The constant amount, corresponding to a constant angle, is determined by a preset circuit P connected to said adder SM, which is set in advance through input h. The adder is operated when an ON control signal is applied to its input 23.

The ON control signal can be provided upon manual controls, or automatically by means of elements detecting parameters involving the engine. For example, at the engine start, the control signal can be caused to depend on the engine temperature, so that at a temperature lower than a predetermined value a temperature detector supplies the ON control signal to input 23 of adder SM, while for temperatures higher than said predetermined value, the detector does not supply the control signal.

What is claimed is:

1. An ignition timing apparatus for use in an internal combustion engine of the type having in combination a cylinder, a piston, a power source and a spark plug having a spark gap, said apparatus comprising:
   (1) charge storage means for storing energy supplied by said power source at a rate determined by the magnitude of said power source;
   (2) control means for:
      (a) applying power generated by said power source to said charge storage means during a charge storage period beginning at a charge initiation instant and ending when the energy stored by said charge storage means reaches a predetermined level; and
      (b) discharging the energy stored by said charge storage means across said spark gap of said spark plug immediately after the energy stored by said charge storage means reaches said predetermined level; and
   (3) timing circut means for controlling said charge initiation instant in such a manner that said energy stored by said charge storage means is discharged across said spark gap at an instant which is determined by the speed of said engine and at least one other engine parameter but is independent of the magnitude of said power supply, said timing circuit means comprising:

(a) pulse generator means for generating a train of pulses having a frequency proportional to the speed of said engine;

(b) first counter means for counting the number of pulses generated by said pulse generator means during successive first and second time periods, said first time period corresponding to said charge storage period, said second time period beginning when said cylinder reaches its top dead center position and terminating when said first counter has counted a first predetermined number of pulses;

(c) second counter means for counting the number of pulses generated by said pulse generator means during a third time period beginning at the end of said second time period and ending when said second counter has counted a second predetermined number of pulses;

(d) count adjust means for varying the value of said second predetermined number of pulses as a function of said at least one engine parameter; and (e) means for causing said control means to apply said power source to said power generated by said charge storage means when said second counter means has counted said second predetermined number of pulses.

2. The ignition timing apparatus of claim 1, wherein said count adjustment means adjusts the value of said second predetermined number of pulses whenever said at least one engine parameter exceeds a predetermined value such that the instant at which said stored energy is discharged across said spark gap is varied when said at least one engine parameter exceeds said predetermined value.

3. The ignition timing apparatus of claim 2, wherein said count adjust means adjusts the value of said second predetermined number of pulses by a fixed amount whenever said at least one engine parameter exceeds said predetermined value.

4. The ignition timing circuit of claim 3, wherein said second counter means comprises:
  a counter for counting the number of pulses applied thereto and for generating an end of count signal when the count in said counter reaches a value determined by a signal applied to a preset input of said counter; and
  gating means for applying said pulses generated by said pulse generator means to said counter during said third time period.

5. The ignition timing circuit of claim 4, wherein said count adjust means comprises:
  a first memory for storing a first predetermined number;
  a second memory for storing a second predetermined number;
  adder means for applying said first predetermined number to said preset input of said counter when said at least one engine parameter is less than said predetermined value and for applying the arithmetic sum of said first and second predetermined numbers to said preset input of said counter when said at least one engine parameter is greater than said predetermined value.

6. The ignition timing apparatus of claim 1 wherein said control circuit generates a charge period signal during said charge storage period and wherein said first counting means comprises:

a first counter;
  means for generating a top dead center signal when said cylinder obtains said top dead center position;
  a comparator for comparing the count stored in said first counter with a count corresponding to said first predetermined number of pulses and for generating an end of count signal when said count in said first counter corresponds to said first predetermined number of pulses, said first predetermined number of pulses establishing a maximum advance of said engine;
  a first gating circuit responsive to said charge period signal, said end of count signal and said top dead center signal for applying said pulses generated by said pulse generator means to a count input of said first counter during said first and second time intervals.

7. The ignition timing apparatus of claim 6, wherein said second counting means comprises:
  a memory storing a number corresponding to said second predetermined number of pulses;
  a second counter coupled to said memory, said second counter generating a second end of count signal when the count stored in said second counter corresponds to said second predetermined number of pulses;
  a second gating circuit responsive to said first and second end of count signals, for applying said pulses generated by said pulse generator means to said second counter during said third time interval.

8. The ignition timing apparatus of claim 7, wherein said first gating circuit comprises:
  a bistable circuit which is set responsive to said top dead center signal and reset responsive to said first end of count signal, whereby the output of said bistable circuit is set for a time period corresponding with said first time period;
  an AND gate having first and second inputs and an output, said first input receiving said pulses generated by said pulse generator means and said output being applied to a count input of said first counter whereby said first counter counts said pulses generated by said pulse generator means whenever a gating signal is applied to said second input of said AND gate; and
  OR gate means receiving the output of said bistable circuit and said charge period signal for applying a gate signal to said second input of said AND gate during said first and second time periods.

9. The ignition timing apparatus of claim 8, wherein said second gating circuit comprises:
  a second bistable circuit which is set responsive to said first end of count signal and which is reset responsive to said second end of count signal such that the output of said second bistable circuit is set for a time period corresponding to said third time period;
  a second AND gate having first and second inputs and an output, said first input receiving said pulses generated by said pulse generator means, said second input connected to said output of said second bistable circuit, said output connected to a count input of said second counter whereby said second counter counts said pulses generated by said pulse generator means during a time period corresponding to said third time period.

10. The ignition timing apparatus of claim 6, wherein the count in said first counter is reset to zero at the initiation of said charge storage period and increases by one for each pulse generated by said pulse generator means during said first and second time periods, said comparator generating said first end of count signal when said count in said first counter reaches said first predetermine member of pulses.

11. The ignition timing apparatus of claim 7, wherein the count in said second counter is reset to the number stored in said memory at the beginning of said third time period and decreases by one for each pulse generated by said pulse generator means during said third time period, said second counter generating means generating said second end of count signal when said count stored therein reaches zero.

* * * * *